United States Patent
Kim et al.

(10) Patent No.: US 11,186,197 B2
(45) Date of Patent: Nov. 30, 2021

(54) METHOD OF CONTROLLING TEMPERATURE OF BATTERY, AND BATTERY MANAGEMENT APPARATUS AND SYSTEM

(71) Applicant: Samsung Electronics Co., Ltd., Suwon-si (KR)

(72) Inventors: YoungJae Kim, Seoul (KR); DongKee Sohn, Seoul (KR); Daebong Jung, Seongnam-si (KR); Ji-young Jeong, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 517 days.

(21) Appl. No.: 15/658,912

(22) Filed: Jul. 25, 2017

(65) Prior Publication Data

US 2018/0093583 A1 Apr. 5, 2018

(30) Foreign Application Priority Data

Oct. 5, 2016 (KR) .................... 10-2016-0128286

(51) Int. Cl.
*H02J 7/00* (2006.01)
*B60L 58/12* (2019.01)
(Continued)

(52) U.S. Cl.
CPC ............... *B60L 58/12* (2019.02); *B60L 50/66* (2019.02); *B60L 58/18* (2019.02); *B60L 58/21* (2019.02);
(Continued)

(58) Field of Classification Search
CPC .............. H02J 7/0031; H02J 2007/004; H02J 2007/0037; H02J 7/0021; H02J 7/0091; H02J 7/0018; H02J 7/047; H02J 7/0063; H02J 7/0047; Y02E 60/12; H01M 10/48; H01M 10/482; H01M 10/443; H01M 10/486; H01M 2010/4271;
(Continued)

(56) References Cited

U.S. PATENT DOCUMENTS 5,541,496 A * 7/1996 Simmonds ............ H02J 7/0091
320/151
5,734,254 A * 3/1998 Stephens ................. H02J 50/80
320/106
(Continued)

FOREIGN PATENT DOCUMENTS

JP 4503567 B2 7/2010
JP 4834985 B2 12/2011
(Continued)

*Primary Examiner* — Richard Isla
*Assistant Examiner* — Mohammed J Sharief
(74) *Attorney, Agent, or Firm* — NSIP Law

(57) ABSTRACT

A method to control a battery temperature includes: determining state difference information of a first battery, among batteries, based on state information of the first battery and average state information of the batteries; calculating a first output value of a first converter corresponding to the first battery based on the determined state difference information; and controlling a charging and discharging process of the batteries to cause the first converter to generate a power flow based on the calculated first output value.

23 Claims, 8 Drawing Sheets

(51) Int. Cl.
*B60L 58/21* (2019.01)
*B60L 50/60* (2019.01)
*B60L 58/25* (2019.01)
*B60L 58/18* (2019.01)
*H01M 10/44* (2006.01)
*H01M 10/48* (2006.01)
*H02J 7/34* (2006.01)
*H01M 10/42* (2006.01)

(52) U.S. Cl.
CPC ........... *B60L 58/25* (2019.02); *H01M 10/443* (2013.01); *H01M 10/482* (2013.01); *H01M 10/486* (2013.01); *H02J 7/0018* (2013.01); *H02J 7/0021* (2013.01); *H02J 7/0047* (2013.01); *H02J 7/0091* (2013.01); *B60L 2240/545* (2013.01); *H01M 2010/4271* (2013.01); *H01M 2220/20* (2013.01); *H02J 7/0063* (2013.01); *H02J 7/34* (2013.01); *Y02T 10/70* (2013.01)

(58) Field of Classification Search
CPC . H01M 2220/20; B60L 11/1872; B60L 58/21; B60L 58/18; B60L 50/66; B60L 58/25; B60L 58/12; B60L 2240/545; Y02T 10/7055; Y10T 307/707
USPC .......................................................... 320/134
See application file for complete search history.

(56) References Cited

U.S. PATENT DOCUMENTS

| | | | |
|---|---|---|---|
| 7,336,002 B2 | 2/2008 | Kato et al. | |
| 7,911,077 B2 | 3/2011 | Ichikawa et al. | |
| 9,214,706 B2 | 12/2015 | Xu et al. | |
| 2002/0003417 A1* | 1/2002 | Bito | B60W 10/26 320/152 |
| 2009/0278499 A1* | 11/2009 | Niculae | H02J 7/0018 320/132 |
| 2011/0187325 A1* | 8/2011 | Lin | H02J 7/00 320/116 |
| 2012/0056587 A1* | 3/2012 | Iida | H01M 10/482 320/118 |
| 2012/0176094 A1* | 7/2012 | Okuda | H01M 10/482 320/134 |
| 2014/0035531 A1* | 2/2014 | Garnier | H02J 1/08 320/118 |
| 2014/0227568 A1 | 8/2014 | Hermann | |
| 2015/0008887 A1* | 1/2015 | Kim | H01M 10/486 320/136 |
| 2015/0035495 A1* | 2/2015 | Yoshida | H02J 7/0021 320/134 |
| 2015/0084597 A1* | 3/2015 | Kim | B60W 10/26 320/127 |
| 2015/0258901 A1 | 9/2015 | Min | |
| 2015/0321576 A1* | 11/2015 | Lee | B60L 58/12 701/22 |
| 2016/0311328 A1* | 10/2016 | Kim | B60L 11/18 |
| 2017/0054134 A1* | 2/2017 | Choi | H02J 7/0013 |
| 2018/0006469 A1* | 1/2018 | Zhao | H01M 10/486 |
| 2018/0083460 A1* | 3/2018 | Min | H01M 10/44 |

FOREIGN PATENT DOCUMENTS

| | | |
|---|---|---|
| JP | 5028049 B2 | 9/2012 |
| JP | 5331493 B2 | 10/2013 |
| JP | 5565276 B2 | 8/2014 |
| JP | 5862631 B2 | 2/2016 |
| KR | 10-2014-0097628 A | 8/2014 |

* cited by examiner

METHOD OF CONTROLLING TEMPERATURE OF BATTERY, AND BATTERY MANAGEMENT APPARATUS AND SYSTEM

CROSS-REFERENCE TO RELATED APPLICATIONS

This application claims the benefit under 35 USC § 119(a) of Korean Patent Application No. 10-2016-0128286 filed on Oct. 5, 2016, in the Korean Intellectual Property Office, the entire disclosure of which is incorporated herein by reference for all purposes.

BACKGROUND

1. Field

The following description relates to controlling a temperature of a battery.

2. Description of Related Art

When a temperature of a battery decreases, performance of the battery and a system in which the battery is provided, for example, an electric vehicle (EV), may be degraded. A method of controlling the temperature of a battery may include connecting a heater to the battery and supplying power to the heater. In such a method, a volume and a weight of a system in which the battery is provided may increase due to the heater. In addition, the method may consume power to control the temperature because power is supplied to the heater.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a method to control a battery temperature includes: determining state difference information of a first battery, among batteries, based on state information of the first battery and average state information of the batteries; calculating a first output value of a first converter corresponding to the first battery based on the determined state difference information; and controlling a charging and discharging process of the batteries to cause the first converter to generate a power flow based on the first output value.

The determining of the state difference information of the first battery may include determining the state difference information of the first battery in response to an average of a temperature of the first battery and a temperature of a second battery, among the batteries, becoming less than or equal to a threshold temperature.

The controlling of the charging and discharging process may include determining an operation mode of the first converter to be either one of a charging mode and a discharging mode, transmitting information on the determined operation mode and the first output value to either one of the first converter and a controller corresponding to the first converter, and in response to a toggling event associated with a change in direction of the power flow occurring, changing the determined operation mode to be another of the charging mode and the discharging mode.

The controlling of the charging and discharging process may include transmitting, to either one of the first converter and the controller, information on the changed operation mode to cause the first converter to generate another power flow different from the power flow.

The determining of the operation mode of the first converter may include determining the operation mode of the first converter using either one or both of electrical-physical quantity information of a power storage different from the first battery and the state information of the first battery.

The calculating of the first output value may include calculating the first output value using the state difference information and required physical quantity information of a load.

The method may further include calculating a second output value corresponding to an electrical-physical quantity flowing in another direction different from a direction of the power flow based on the first output value and an output value of a second battery, among the batteries.

The power flow may include power corresponding to the first output value flowing from one end to another end of the first converter. In response to a toggling event associated with a change in direction occurring, another power flow flowing in the other direction and having power corresponding to the second output value flowing from the other end to the one end may be generated.

The controlling of the charging and discharging process may include: classifying the first battery and a second battery, among the batteries, that satisfy a requirement into a group; determining an operation mode of the first converter and an operation mode of a second converter corresponding to the second battery to be different from each other; and in response to a toggling event associated with a change in direction of the power flow in the group occurring, changing the determined operation mode of each of the first converter and the second converter.

The requirement may include either one or both of a requirement associated with a difference between the state information of the first battery and state information of the second battery, and a requirement associated with proximity between the first battery and the second battery.

The first converter may be configured to receive first power corresponding to the first output value from the first battery and output the first power to the second converter before the toggling event occurs, and to receive second power corresponding to a second output value of the second converter from the second battery and charge the first battery with the second power, in response to the toggling event occurring.

The may further include terminating the charging and discharging process, in response to an average of a temperature of the first battery and a temperature of a second battery, among the batteries, being greater than or equal to a target temperature, as a result of the charging and discharging process.

A non-transitory computer-readable storage medium may store instructions that, when executed by a processor, cause the processor to perform the method.

In another general aspect, a battery management apparatus includes: a controller configured to determine state difference information of a first battery, among batteries, based on state information of the battery and average state information of the batteries, calculate a first output value of a first converter corresponding to the first battery based on the determined state difference information, and control a charging and discharging process of the batteries to cause the first converter to generate a power flow based on the first output value.

The controller may be configured to determine the state difference information of the first battery in response to an average of a temperature of the first battery and a temperature of a second battery, among the batteries, becoming less than or equal to a threshold temperature.

The controller may be further configured to determine an operation mode of the first converter to be one of a charging mode and a discharging mode, transmit information on the determined operation mode and the first output value to either one of the first converter and a sub-controller corresponding to the first converter, and change the determined operation mode to the other operation mode, in response to a toggling event associated with a change in direction of the power flow occurring.

The controller may be further configured to transmit information on the changed operation mode to either one of the first converter and the sub-controller to cause the first converter to generate another power flow different from the power flow.

The controller may be further configured to determine the operation mode of the first converter using either one or both of electrical-physical quantity information of a power storage different from the first battery and the state information of the first battery.

The controller may be further configured to calculate the first output value using the state difference information and required physical quantity information of a load.

The controller may be further configured to calculate a second output value corresponding to an electrical-physical quantity flowing in another direction different from a direction of the power flow based on the first output value and an output value of a second battery, among the batteries.

The controller may be further configured to classify the first battery and a second battery, among the batteries, which satisfy a preset requirement, into a group, determine an operation mode of the first converter and an operation mode of a second converter corresponding to the second battery to be different from each other, and change the determined operation mode of each of the first converter and the second converter, in response to a toggling event associated with a change in direction of the power flow in the group occurring.

The requirement may include either one or both of a requirement associated with a difference between the state information of the battery and state information of the other battery, and a requirement associated with proximity between the first battery and the second battery.

The apparatus may further include: a memory configured to store an instruction to operate the controller.

In another general aspect, a battery management system includes: a slave manager configured to sense a physical quantity of a battery, among batteries; and a master manager configured to receive the sensed physical quantity from the slave manager and determine state information of the battery based on the received physical quantity, determine state difference information of the battery based on the determined state information and average state information of the batteries, calculate an output value of a converter corresponding to the battery based on the determined state difference information, and control a charging and discharging process of the batteries to cause the converter to generate a power flow based on the calculated output value.

Other features and aspects will be apparent from the following detailed description, the drawings, and the claims.

Figure 1:
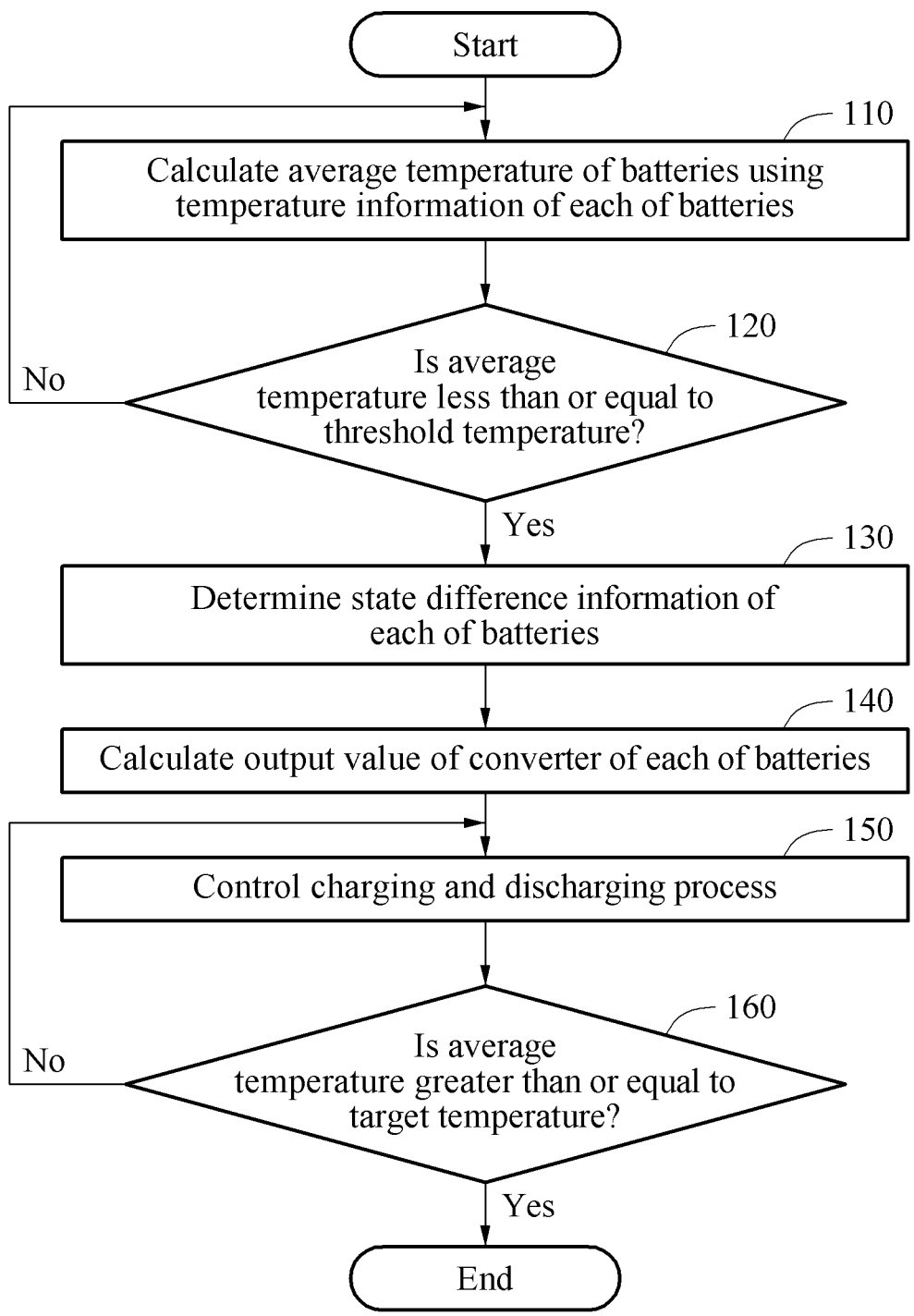
FIG. 1 is a flowchart illustrating an example of a method of controlling a temperature of a battery.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

As used herein, the term "and/or" includes any one and any combination of any two or more of the associated listed items.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," and "lower" may be used herein for ease of description to describe one element's relationship to another element as shown in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

The features of the examples described herein may be combined in various ways as will be apparent after an understanding of the disclosure of this application. Further, although the examples described herein have a variety of configurations, other configurations are possible as will be apparent after an understanding of the disclosure of this application.

Unless otherwise defined, all terms, including technical and scientific terms, used herein have the same meaning as commonly understood by one of ordinary skill in the art to which this disclosure pertains. Terms, such as those defined in commonly used dictionaries, are to be interpreted as having a meaning that is consistent with their meaning in the context of the relevant art, and are not to be interpreted in an idealized or overly formal sense unless expressly so defined herein.

FIG. 1 is a flowchart illustrating an example of a method of controlling a temperature of a battery. Hereinafter, the method of controlling a temperature of a battery will be simply referred to as a battery temperature controlling method. The battery temperature controlling method is performed, for example, by a battery management apparatus.

Referring to FIG. 1, in operation 110, the battery management apparatus calculates an average temperature of batteries using temperature information of each of the batteries. A battery is, for example, a battery cell, a battery module, or a battery pack.

In operation 120, the battery management apparatus determines whether the calculated average temperature is less than or equal to a threshold temperature. In an example, the threshold temperature is −5 degrees Celsius (° C.). However, the threshold temperature is not limited to the aforementioned example threshold temperature.

In response to the average temperature being determined to be greater than the threshold temperature, the battery management apparatus transmits a sensing instruction to one or more temperature sensors or one or more slave managers corresponding to the batteries. The battery management apparatus then receives the temperature information of each of the batteries from the one or more temperature sensors or the one or more slave managers. The battery management apparatus calculates the average temperature using the received temperature information.

In operation 130, in response to the average temperature being determined to be less than or equal to the threshold temperature, the battery management apparatus determines state difference information of each of the batteries. The battery management apparatus determines the state difference information of each of the batteries using state information, for example, a state of charge (SoC), of each of the batteries, and average state information of the batteries. For example, when the state information of each of the batteries is $SoC_1, SoC_2, SoC_3, \ldots, SoC_N$, the battery management apparatus calculates the average state information, for example, $SoC_{average}$, which is an average value of $SoC_1, SoC_2, SoC_3, \ldots, SoC_N$. The battery management apparatus determines the state difference information of each of the batteries based on Equation 1 below.

$$\Delta SoC_n = SoC_n - SoC_{average}, \text{ wherein } n=1, 2, \ldots, N \quad \text{[Equation 1]}$$

In operation 140, the battery management apparatus calculates an output value of a converter corresponding to each of the batteries. The battery management apparatus calculates the output value of a converter corresponding to each of the batteries using required physical quantity information of a load and the determined state difference information of each of the batteries. For example, the battery management apparatus calculates the output value based on Equation 2 below.

$$P_{target\_n} = P_{average} + P_{average} \times \Delta SoC_n \quad \text{[Equation 2]}$$

In Equation 2, $P_{target\_n}$ is an output value of a converter, for example, output power of the converter. $P_{average}$ is required physical quantity information of a load, for example, required power of a load.

In operation 150, the battery management apparatus controls a charging and discharging process. The battery management apparatus controls the charging and discharging process to change a temperature of each of the batteries.

The charging and discharging process includes an operation of a converter associated with charging and/or discharging each of the batteries. The battery management apparatus controls the operation of the converter by controlling the charging and discharging process.

In an example, the battery management apparatus allows a converter corresponding to each of the batteries to generate a power flow based on the output value of the converter. The converter generates the power flow corresponding to $P_{target\_n}$ from a battery corresponding to the converter to a power storage, which includes, for example, an auxiliary battery or an ultracapacitor. That is, the converter discharges the corresponding battery to charge the power storage. In addition, the battery management apparatus allows the converter corresponding to each of the batteries to generate another power flow in a direction different from a direction of the power flow described in the foregoing description. The converter generates the other power flow corresponding to $P_{target\_n}$ from the power storage to the corresponding battery. That is, the converter discharges the power storage to charge the corresponding battery. In response to generation or repetition of a power flow in a single direction and/or both directions, heat is generated by a current flowing in an internal resistance of each of the batteries. Thus, a temperature of each of the batteries increases as a result of the power flow. An example of controlling the charging and discharging process will be described in detail with reference to FIGS. 2 and 3.

In another example, the battery management apparatus may classify the batteries into groups. The battery management apparatus allows one or more converters associated with each of the groups to generate a power flow. A converter associated with a group receives power corresponding to $P_{target\_n}$ from a battery corresponding to the converter, and outputs the power corresponding to $P_{target\_n}$ to another converter associated with the group. The other converter outputs the power corresponding to $P_{target\_n}$ to a battery corresponding to the other converter. Thus, the battery corresponding to the converter is discharged, and the battery corresponding to the other converter may be charged. In addition, the battery management apparatus may allow the converter and/or the other converter to generate a power flow in a direction different from a direction of a previously generated power flow. Thus, the other converter may receive power corresponding to $P_{target\_m}$ from the corresponding battery, and output the power corresponding to $P_{target\_m}$ to the converter. The converter may output the power corresponding to $P_{target\_m}$ to the corresponding battery. Thus, the battery corresponding to the other converter is discharged, and the battery corresponding to the converter may be charged. In response to generation or repetition of a power flow in a single direction and/or two directions, heat is generated by a current flowing in an internal resistance of each of the batteries. Thus, a temperature of each of the batteries increases. Another example of controlling the charging and discharging process will be described in detail with reference to FIG. 4.

The battery management apparatus calculates an average temperature of the batteries based on recent temperatures of the batteries acquired after the charging and discharging process. In response to each of the batteries being charged and/or discharged through the controlling of the charging and discharging process, the battery management apparatus collects the temperature information of each of the batteries, and calculates the average temperature of the batteries using the collected temperature information.

In operation 160, the battery management apparatus determines whether the average temperature of the batteries is greater than or equal to a target temperature. In an example, the target temperature is 10° C. However, the target temperature is not limited to the aforementioned example target temperature.

In operation 150, in response to operation 160 resulting in a determination that the average temperature is less than the target temperature, the battery management apparatus controls the charging and discharging process. For example, the battery management apparatus allows a converter to discharge or charge a battery corresponding to the converter. In response to operation 160 resulting in a determination that the average temperature is greater than or equal to the target temperature, the battery management apparatus terminates the charging and discharging process.

Figure 2:
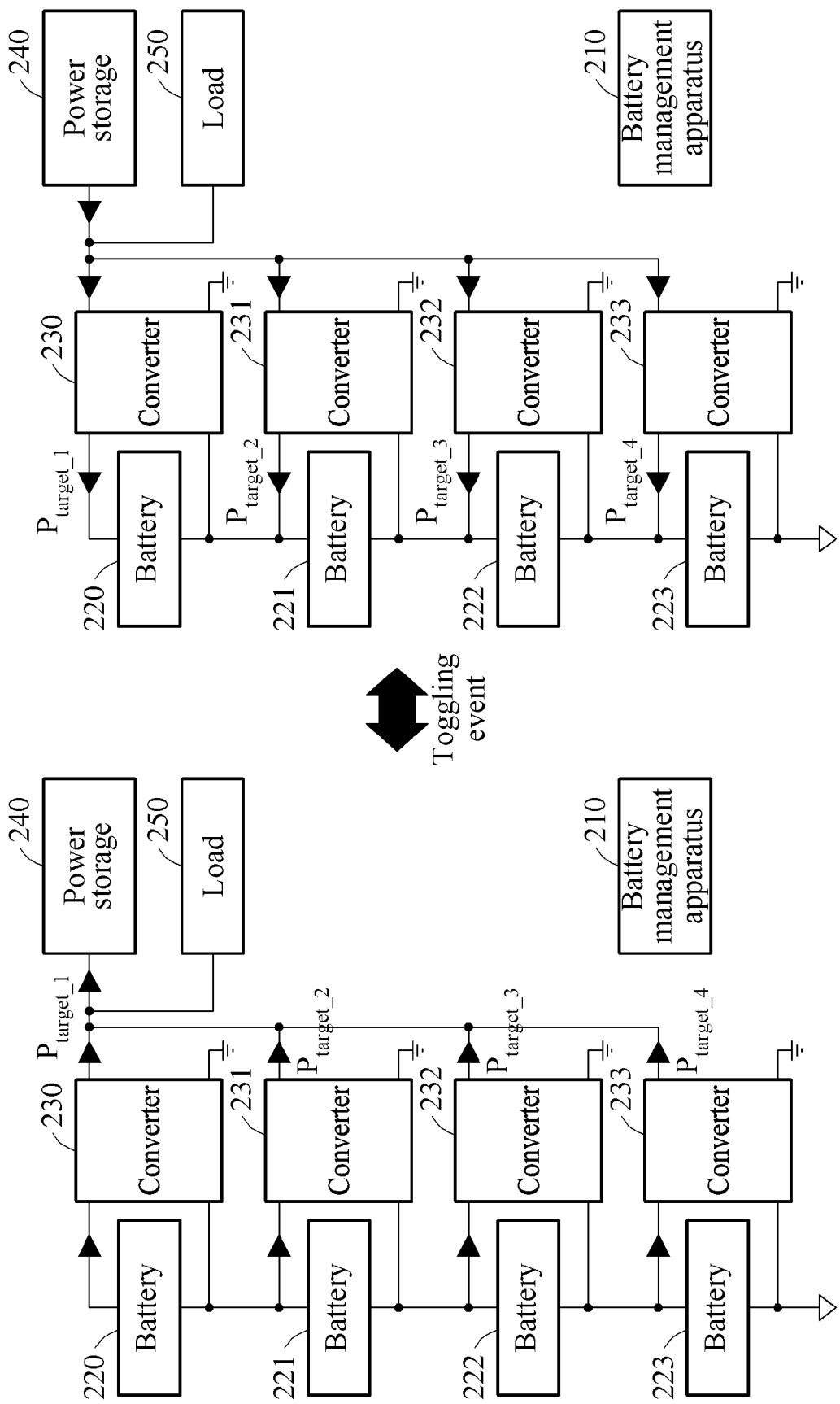
FIGS. 2 and 3 are diagrams illustrating an example of controlling a charging and discharging process.
Figure 3:
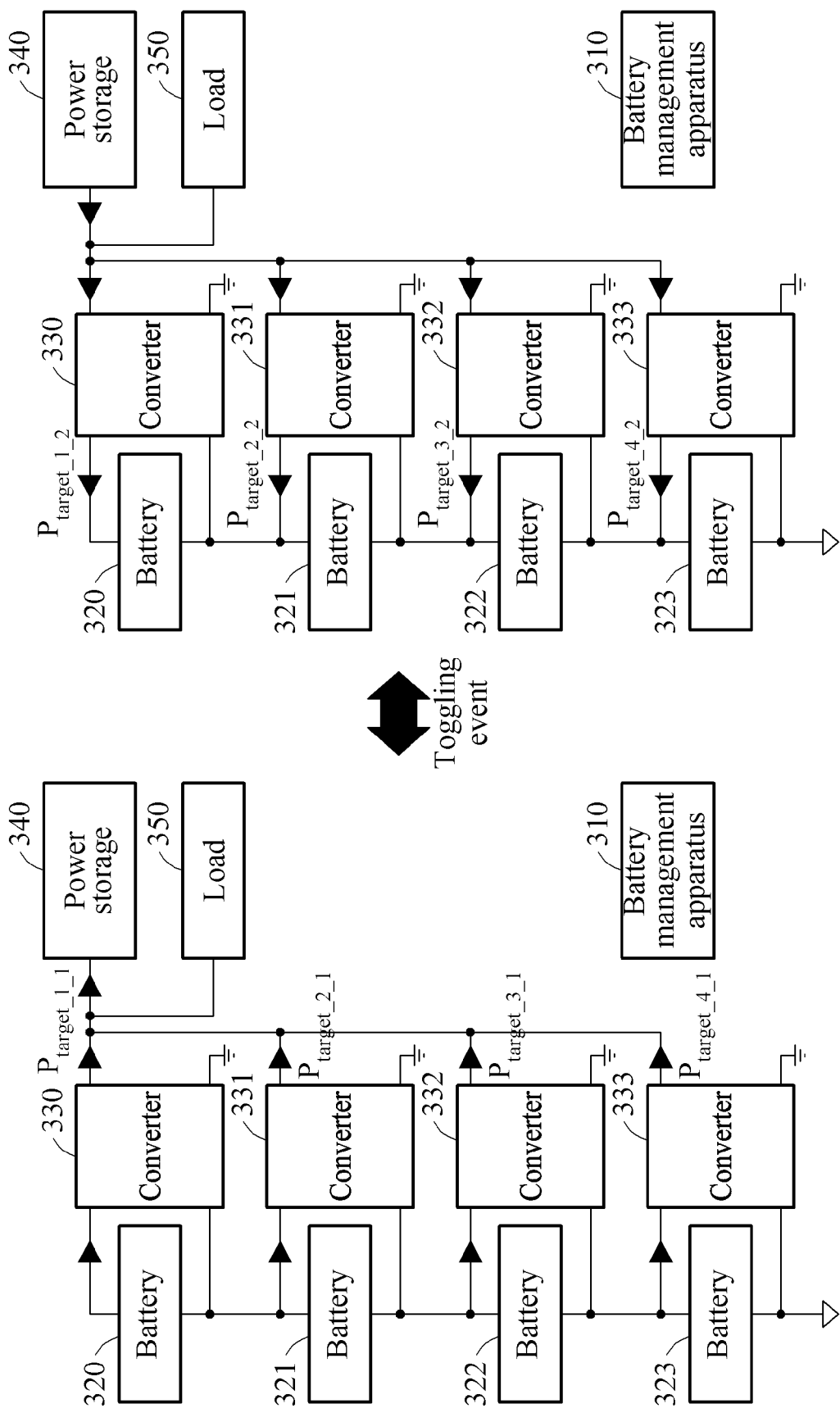

FIGS. 2 and 3 are diagrams illustrating an example of controlling a charging and discharging process.

FIG. 2 illustrates a battery management apparatus 210, batteries, for example, a battery 220, a battery 221, a battery 222, and a battery 223, and converters, for example, a converter 230, a converter 231, a converter 232, and a converter 233.

Each of the converters 230, 231, 232, and 233 is, for example, a direct current to direct current (DC-DC) converter. In addition, each of the converters 230, 231, 232, and 233 is a bidirectional converter.

In an example in which respective pieces of state information of the batteries 220, 221, 222, and 223 are indicated as $SoC_1$, $SoC_2$, $SoC_3$, and $SoC_4$, and respective values of $SoC_1$, $SoC_2$, $SoC_3$, and $SoC_4$ are 0.9, 0.85, 0.7, and 0.95 ($SoC_1$=0.9, $SoC_2$=0.85, $SoC_3$=0.7, and $SoC_4$=0.95), an average value $SoC_{average}$ is 0.85.

$$SoC_{average} = 0.85$$

Based on Equation 1 above, $\Delta SoC_1$=0.05, $\Delta SoC_2$=0, $\Delta SoC_3$=−0.15, and $\Delta SoC_4$=0.1.

The battery management apparatus 210 calculates respective output values, for example, $P_{target\_1}$, $P_{target\_2}$, $P_{target\_3}$, and $P_{target\_4}$, of the converters 230, 231, 232, and 233 using each of $\Delta SoC_1$, $\Delta SoC_2$, $\Delta SoC_3$, and $\Delta SoC_4$, and required physical quantity information $P_{average}$ of a load 250. The load 250 may include a low-voltage load that operates at a low voltage, for example, 12 DC voltages ($V_{DC}$). In an example in which a value of $P_{average}$ is 10 watts (W), respective values of $P_{target\_1}$, $P_{target\_2}$, $P_{target\_3}$, and $P_{target\_4}$ is obtained as follows based on Equation 2 above.

$$P_{target\_1} = 10 + 10 \times 0.05 = 10.5 \text{ W}$$

$$P_{target\_2} = 10 + 10 \times 0 = 10 \text{ W}$$

$$P_{target\_3} = 10 + 10 \times (-0.15) = 8.5 \text{ W}$$

$$P_{target\_4} = 10 + 10 \times 0.1 = 11 \text{ W}$$

When the respective output values of the converters 230, 231, 232, and 233 are calculated, the battery management apparatus 210 controls a charging and discharging process. The controlling of the charging and discharging process will be described hereinafter.

The battery management apparatus 210 determines an operation mode of each of the converters 230, 231, 232, and 233. The operation mode may be a charging mode (for example, charging=1) or a discharging mode (for example, charging=0). In an example, the battery management apparatus 210 determines the operation mode of each of the converters 230, 231, 232, and 233 based on at least one of state information of each of the batteries 220, 221, 222, and 223 and electrical-physical quantity information of a power storage 240. For example, in response to a voltage of the power storage 240 being determined to be less than a preset reference value, for example, 30V, the battery management apparatus 210 determines the operation mode of each of the converters 230, 231, 232, and 233 to be the discharging mode, to charge the power storage 240. In addition, in response to at least one of respective pieces of the state information, for example, SoC, of the batteries 220, 221, 222, and 223 being determined to be less than state information, for example, SoC, of the power storage 240, the battery management apparatus 210 determines the operation mode of each of the converters 230, 231, 232, and 233 to be the charging mode.

Hereinafter, a description will be provided based on the converter 230. The following description based on the converter 230 is applicable to the other converters 231, 232, and 233.

Hereinafter, it is assumed that the battery management apparatus 210 determines the operation mode of the converter 230 to be the discharging mode.

The battery management apparatus 210 transmits information on the determined operation mode and $P_{target\_1}$ to the converter 230. In an example, the battery management apparatus 210 transmits the information on the determined operation mode and $P_{target\_1}$ to a slave manager (not shown) corresponding to the converter 230.

In an example illustrated in a left portion of FIG. 2, the converter 230 generates a power flow flowing towards the power storage 240 from the battery 220. Thus, the battery 220 starts being discharged, and the power storage 240 starts being charged. While the converter 230 is operating in the discharging mode, the converter 230 receives an electrical-physical quantity, for example, power or a current, from the battery 220. The converter 230 steps down a voltage converting an input power into direct current (DC) powers by each of converters, and collectively outputting a total DC power by the converters. That is, the converter 230 converts a high-voltage, for example, 80V, power or a high-voltage current to a low-voltage, for example, 12V, or a low-voltage current. The converter 230 outputs, to the power storage 240, the electrical-physical quantity having the stepped down voltage.

A toggling event associated with a change in direction of a power flow may occur. For example, a preset period of time may elapse. The period of time may be indicated in seconds. The period of time is not limited to the foregoing example, and may thus be indicated in a unit smaller than the seconds, for example, milliseconds, or a unit greater than the seconds, for example, minutes. In addition, each of the converters 230, 231, 232, and 233 outputs, to the power storage 240, an electrical-physical quantity corresponding to an output value of each of the converters 230, 231, 232, and 233.

In response to the toggling event occurring, the battery management apparatus 210 controls the charging and discharging process. For example, the battery management apparatus 210 changes the operation mode of the converter 230 to the charging mode. In response to the toggling event occurring, the battery management apparatus 210 determines whether an average temperature of the batteries 220, 221, 222, and 223, is greater than or equal to a target temperature. In response to the average temperature being determined to be greater than or equal to the target temperature, the battery management apparatus 210 terminates the charging and discharging process.

The battery management apparatus 210 transmits information on the changed operation mode to the converter 230. In an example, the battery management apparatus 210 transmits the information on the changed operation mode to a slave manager corresponding to the converter 230.

In an example illustrated in the right portion of FIG. 2, the converter 230 generates a power flow flowing from the power storage 240 to the battery 220. Thus, the power storage 240 starts being discharged, and the battery 220 starts being charged. While the converter 230 is operating in the charging mode, the converter 230 receives an electrical-physical quantity, for example, power or a current, from the power storage 240. The converter 230 steps up a voltage of the received electrical-physical quantity, for example, power or a current. That is, the converter 230 converts a low-voltage power or a low-voltage current to a high-voltage power or a high-voltage current. The converter 230 outputs, to the battery 220, the electrical-physical quantity that is obtained through the conversion.

A toggling event may occur. That is, a preset period of time may elapse. Alternatively, each of the batteries 220, 221, 222, and 223 may be charged with an electrical-physical quantity corresponding to a discharged electrical-physical quantity. In such a case, the battery management apparatus 210 determines whether an average temperature of respective temperatures of the batteries 220, 221, 222, and 223 is greater than or equal to a target temperature. In response to the average temperature being determined to be greater than or equal to the target temperature, the battery management apparatus 210 terminates the charging and discharging process.

According to an example, in response to the toggling event occurring, the example illustrated in the left portion of FIG. 2 may be performed. That is, based on the controlling of the charging and discharging process, the example illustrated in the left portion of FIG. 2 and the example illustrated in the right portion of FIG. 2 may be alternately performed. The charging and discharging process may be repetitively performed on the batteries 220, 221, 222, and 223 by a preset number of times, for example, 100 times.

Through the controlling of the charging and discharging process, heat is generated by a charging current and a discharging current flowing in an internal resistance of each of the batteries 220, 221, 222, and 223. That is, due to a power flow in a single direction and/or both directions, heat is generated in each of the batteries 220, 221, 222, and 223. Thus, a temperature of each of the batteries 220, 221, 222, and 223 may increase.

The battery management apparatus 210 increases a temperature of each of the batteries 220, 221, 222, and 223 without consuming power of each of the batteries 220, 221, 222, and 223.

FIG. 3 illustrates a battery management apparatus 310, batteries, for example, a battery 320, a battery 321, a battery 322, and a battery 323, and converters, for example, a converter 330, a converter 331, a converter 332, and a converter 333.

The battery management apparatus 310 calculates respective output values of the converters 330, 331, 332, and 333, for example, $P_{target\_1\_1}$, $P_{target\_2\_1}$, $P_{target\_3\_1}$, and $P_{target\_4\_1}$, using each of $\Delta SoC_1$, $\Delta SoC_2$, $\Delta SoC_3$, and $\Delta SoC_4$, and required physical quantity information $P_{average}$ of a load 350. In this example, it is assumed that state information $SoC_1$ of the battery 320 is 0.9 ($SoC_1$=0.9), state information $SoC_2$ of the battery 321 is 0.85 ($SoC_2$=0.85), state information $SoC_3$ of the battery 322 is 0.7 ($SoC_3$=0.7), and state information $SoC_4$ of the battery 323 is 0.95 ($SoC_4$=0.95). In response to a value of $P_{average}$ being 10 W ($P_{average}$=10 W), $P_{target\_1\_1}$, $P_{target\_2\_1}$, $P_{target\_3\_1}$, and $P_{target\_4\_1}$ are 10.5 W, 10 W, 8.5 W, and 11 W, respectively as described with reference to FIG. 2.

Unlike the examples illustrated in FIG. 2, the battery management apparatus 310 calculates another output value of each of the converters 330, 331, 332, and 333 using the calculated output values. For example, the battery management apparatus 310 determines an average value of the calculated output values to be the other output value of each of the converters 330, 331, 332, and 333. For example, an average value of $P_{target\_1\_1}$, $P_{target\_2\_1}$, $P_{target\_3\_1}$, and $P_{target\_4\_1}$ is 10, and thus $P_{target\_1\_2} = P_{target\_2\_2} = P_{target\_3\_2} = P_{target\_4\_2} = 10$.

When the output values of the converters 330, 331, 332, and 333 and the other output value of each of the converters 330, 331, 332, and 333 are calculated, the battery management apparatus 310 controls a charging and discharging process. Hereinafter, controlling the charging and discharging process will be described.

Referring to FIG. 3, the battery management apparatus 310 determines an operation mode of each of the converters 330, 331, 332, and 333. The operation mode of each converter is described with reference to FIG. 2, and thus a more detailed description will be omitted here.

Hereinafter, a description will be provided based on the converter 330. The following description based on the converter 330 is applicable to the other converters 331, 332, and 333.

Hereinafter, it is assumed that the battery management apparatus 310 determines the operation mode of the converter 330 to be a discharging mode.

The battery management apparatus 310 transmits information on the determined operation mode and $P_{target\_1\_1}$ to the converter 330. According to an example, the battery management apparatus 310 transmits the information on the determined operation mode and $P_{target\_1\_1}$ to a slave manager (not shown) corresponding to the converter 330.

In an example illustrated in a left portion of FIG. 3, the converter 330 generates a power flow flowing towards a power storage 340 from the battery 320. Thus, the battery 320 starts being discharged, and the power storage 340 starts being charged. While the converter 330 is operating in the discharging mode, the converter 330 receives an electrical-physical quantity, for example, power or a current, from the battery 320. The converter 330 steps down a voltage of the received electrical-physical quantity. The converter 330 outputs, to the power storage 340, the electrical-physical quantity having the stepped down voltage.

A toggling event may occur. In response to the toggling event occurring, the battery management apparatus 310 controls a charging and discharging process. For example, the battery management apparatus 310 changes the operation mode of the converter 330 to a charging mode.

The battery management apparatus 310 transmits information on the changed operation mode and $P_{target\_1\_2}$ to the converter 330. Unlike the example illustrated in the right portion of FIG. 2, the battery management apparatus 310 transmits the other output value $P_{target\_1\_2}$ of the converter 330 to the converter 330. According to an example, the battery management apparatus 310 transmits the information on the changed operation mode and $P_{target\_1\_2}$ to the slave manager corresponding to the converter 330.

In an example illustrated in a right portion of FIG. 3, the converter 330 generates a power flow flowing towards the battery 320 from the power storage 340. Thus, the power storage 340 starts being discharged, and the battery 320 starts being charged. While the converter 330 is operating in the charging mode, the converter 330 receives an electrical-physical quantity from the power storage 340. The converter 330 steps up a voltage of the received electrical-physical quantity. The converter 330 outputs, to the battery 320, the electrical-physical quantity having the stepped up voltage.

A toggling event may occur. For example, a preset period of time may elapse. Alternatively, each of the batteries 320, 321, 322, and 323 is charged with an electrical-physical quantity corresponding to each of the batteries 320, 321, 322, and 323, for example, $P_{target\_1\_2}$, $P_{target\_2\_2}$, $P_{target\_3\_2}$, and $P_{target\_4\_2}$. In such a case, the battery management apparatus 310 determines whether an average temperature of respective temperatures of the batteries 320, 321, 322, and 323 is greater than or equal to a target temperature. In response to the average temperature being determined to be greater than or equal to the target temperature, the battery management apparatus 310 terminates the charging and discharging process.

Through the controlling of the charging and discharging process, heat is generated by a charging current and a discharging current in an internal resistance of each of the batteries 320, 321, 322, and 323. Thus, a temperature of each of the batteries 320, 321, 322, and 323 may increase.

The battery management apparatus 310 may increase a temperature of each of the batteries 320, 321, 322, and 323 without consuming power of each of the batteries 320, 321, 322, and 323. In addition, pieces of state information of the batteries 320, 321, 322, and 323 may be equalized. For example, the battery 322 with relatively low state information is discharged less and charged more, and the batteries 320 and 323 with relatively high state information are discharged more and charged less. Thus, the pieces of state information of the batteries 320, 321, 322, and 323 may become equalized.

Figure 4:
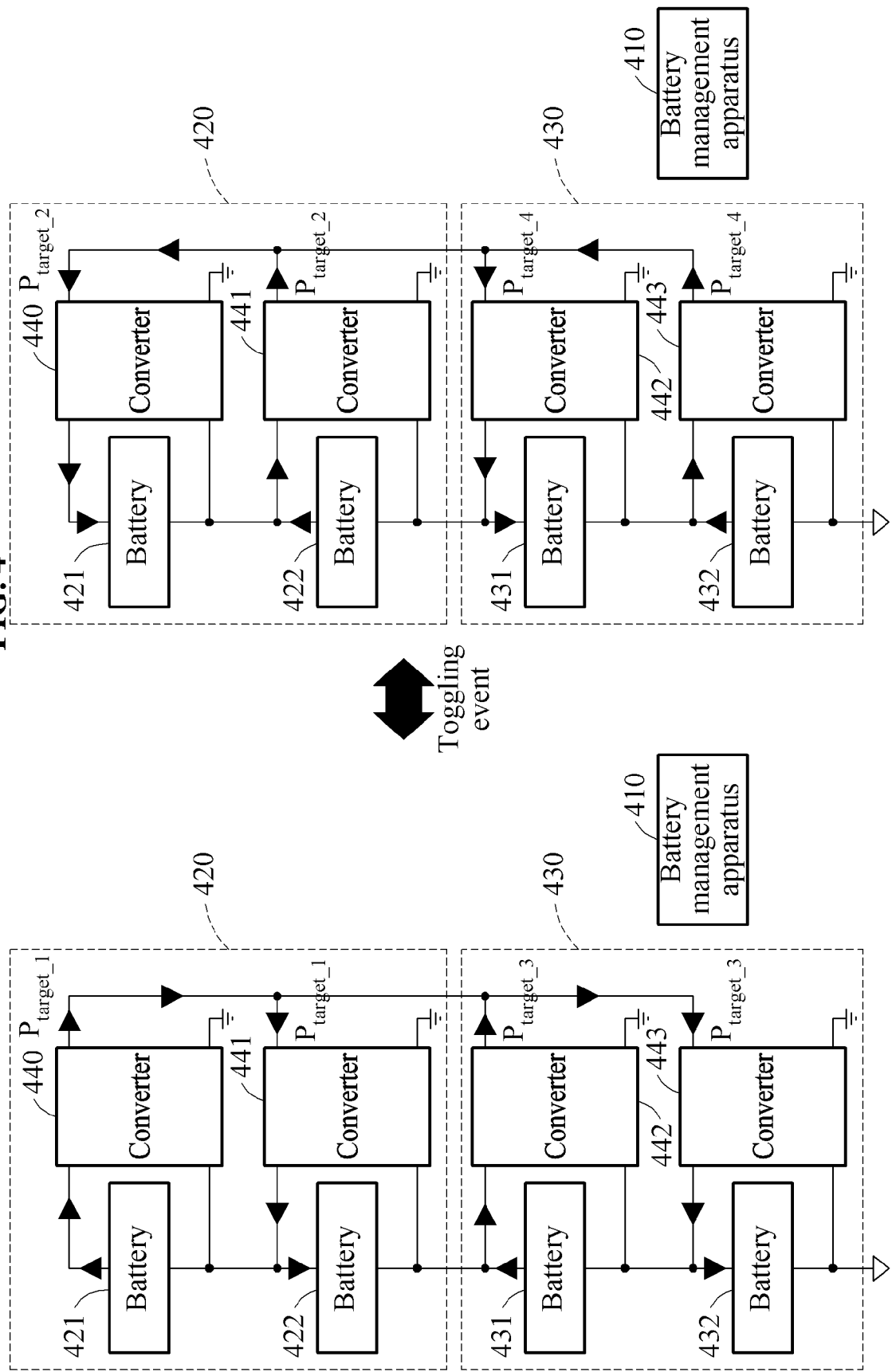
FIG. 4 is a diagram illustrating another example of controlling a charging and discharging process.

FIG. 4 is a diagram illustrating another example of controlling a charging and discharging process. FIG. 4 illustrates a battery management apparatus 410, batteries, for example, a battery 421, a battery 422, a battery 431, and a battery 432, and converters, for example, a converter 440, a converter 441, a converter 442, and a converter 443.

In this example, it is assumed that state information $SoC_1$ of the battery 421 is 0.9 ($SoC_1$=0.9), state information $SoC_2$ of the battery 422 is 0.85 ($SoC_2$=0.85), state information $SoC_3$ of the battery 431 is 0.7 ($SoC_3$=0.7), and state information $SoC_4$ of the battery 432 is 0.95 ($SoC_4$=0.95). In response to a value of $P_{average}$ being 10 W ($P_{average}$=10 W), $P_{target\_1\_1}$, $P_{target\_2\_1}$, $P_{target\_3\_1}$, and $P_{target\_4\_1}$ are 10.5 W, 10 W, 8.5 W, and 11 W, respectively, as described above with reference to FIG. 2.

The battery management apparatus 410 classifies the batteries 421, 422, 431, and 432 into groups, for example, a group 420 and a group 430. The battery management apparatus 410 classifies batteries, among the batteries 421, 422, 431, and 432 that satisfy a preset requirement into a same group, among the groups 420 and 430.

In an example, the requirement is associated with proximity between the batteries 421, 422, 431, and 432. The battery management apparatus 410 classifies the batteries 421, 422, 431, and 432 into the groups 420 and 430 based on the proximity. Referring to FIG. 4, the battery management apparatus 410 sets the battery 421 and the battery 422 that are proximate to each other to constitute the group 420, and the battery 431 and the battery 432 that are proximate to each other to constitute the group 430.

In another example, the requirement is associated with state information of each of the batteries 421, 422, 431, and 432. The battery management apparatus 410 classifies the batteries 421, 422, 431, and 432 into the groups 420 and 430, using state information of each of the batteries 421, 422, 431, and 432.

For example, the battery management apparatus 410 sorts life state information of each of the batteries 421, 422, 431, and 432 based on an extent of the life state information. The life state information may be, for example, a state of health (SoH). The battery management apparatus 410 may set batteries corresponding to top n pieces (where n is an integer) of the life state information to be a group, and batteries corresponding to top n remaining pieces of the life state information to be another group. For example, in an example in which life state information $SoH_1$ of the battery 421 is 0.95 ($SoH_1$=0.95), life state information $SoH_2$ of the battery 422 is 0.93 ($SoH_2$=0.93), life state information $SoH_3$ of the battery 431 is 0.98 (SoH$_3$=0.98), and life state information SoH$_4$ of the battery 432 is 0.91 (SoH$_4$=0.91), the battery management apparatus 410 sets the battery 431 with a highest SoH value and the battery 421 with a second highest SoH value to be a group, and also sets the battery 422 and the battery 432 to be another group.

In another example, the battery management apparatus 410 sorts charging state information of each of the batteries 421, 422, 431, and 432 based on an extent of the charging state information. The charging state information is, for example, an SoC. The battery management apparatus 410 sets a battery corresponding to a highest SoC value and a battery corresponding to a lowest SoC value to be a group, and also sets a battery corresponding to a second highest SoC value and a battery corresponding to a second lowest SoC value to be another group. Referring to FIG. 4, the battery management apparatus 410 sets the battery 432 with a highest SoC value and the battery 431 with a lowest SoC value to be the group 430. In addition, the battery management apparatus 410 sets the battery 421 and the battery 422 to be the group 420.

The above groupings are provided only as illustrative examples, and the requirements for grouping batteries is not limited to the examples in the foregoing description.

Hereinafter, a description will be provided based on the group 420. The following description based on the group 420 is also applicable to the group 430.

Referring to FIG. 4, the battery management apparatus 410 determines an operation mode of each of the converter 440 corresponding to the battery 421 in the group 420 and the converter 441 corresponding to the battery 422 in the group 420. The battery management apparatus 410 determines the operation mode of the converter 440 and the operation mode of the converter 441 to be different from each other to generate a power flow flowing in a single direction between the converter 440 and the converter 441.

In this example, it is assumed that the battery management apparatus 410 determines the operation mode of the converter 440 to be a discharging mode, and determines the operation mode of the converter 441 to be a charging mode.

The battery management apparatus 410 transmits information on the discharging mode and P$_{target\_1}$ to the converter 440. According to an example, the battery management apparatus 410 transmits the information on the discharging mode and P$_{target\_1}$ to a slave manager corresponding to the converter 440. In addition, the battery management apparatus 410 transmits information on the charging mode to the converter 441 or a slave manager corresponding to the converter 441. The battery management apparatus 410 transmits, to the converter 441 or the slave manager corresponding to the converter 441, P$_{target\_1}$ along with the information on the charging mode.

In an example illustrated in a left portion of FIG. 4, the converter 440 and/or the converter 441 generates a power flow flowing towards the battery 422 from the battery 421. While the converter 440 is operating in the discharging mode, the converter 440 receives an electrical-physical quantity, for example, power or a current, from the battery 421. The converter 440 steps down a voltage of the received electrical-physical quantity. The converter 440 outputs, to the converter 441, the electrical-physical quantity having the voltage that is stepped down. The converter 441 steps up the voltage of the electrical-physical quantity, and outputs the electrical-physical quantity having the stepped up voltage to the battery 422.

A toggling event associated with a change in direction of the power flow may occur. The toggling event includes, for example, an event associated with a lapse of a preset period of time. In addition, the toggling event may include an event associated with completion of charging the battery 422 with an electrical-physical quantity corresponding to P$_{target\_1}$ and/or an event associated with completion of charging the battery 432 with an electrical-physical quantity corresponding to P$_{target\_3}$.

In response to the toggling event occurring, the battery management apparatus 410 controls a charging and discharging process. For example, the battery management apparatus 410 changes the operation mode of the converter 440 to be the charging mode, and changes the operation of the converter 441 to the discharging mode.

The battery management apparatus 410 transmits information on the discharging mode and P$_{target\_2}$ to the converter 441. According to an example, the battery management apparatus 410 may transmit the information on the discharging mode and P$_{target\_2}$ to the slave manager corresponding to the converter 441. In addition, the battery management apparatus 410 transmits information on the charging mode to the converter 440 or the slave manager corresponding to the converter 440. The battery management apparatus 410 transmits, to the converter 440 or the slave manager corresponding to the converter 440, P$_{target\_2}$ along with the information on the charging mode.

In an example illustrated in a right portion of FIG. 4, the converter 441 and/or the converter 440 generates a power flow flowing towards the battery 421 from the battery 422. While the converter 441 is operating in the discharging mode, the converter 441 receives an electrical-physical quantity from the battery 422. The converter 441 steps down a voltage of the received electrical-physical quantity. The converter 441 outputs, to the converter 440, the electrical-physical quantity having the stepped down voltage. The converter 440 steps up the voltage of the electrical-physical quantity, and outputs the electrical-physical quantity having the stepped up voltage to the battery 421. Thus, the battery 422 is discharged and the battery 421 is charged.

A toggling event may occur. For example, a preset period of time elapses. Alternatively, the battery 421 is charged with an electrical-physical quantity corresponding to P$_{target\_2}$, and the battery 431 is charged with an electrical-physical quantity corresponding to P$_{target\_4}$. In such a case, the battery management apparatus 410 determines whether an average temperature of respective temperatures of the batteries 421, 422, 431, and 432 is greater than or equal to a target temperature. In response to the average temperature being determined to be greater than or equal to the target temperature, the battery management apparatus 410 terminates the charging and discharging process. According to an example, in response to the toggling event occurring, the example illustrated in the left portion of FIG. 4 is performed.

Through the controlling of the charging and discharging process, heat is generated by a charging current and a discharging current flowing in an internal resistance of each of the batteries 421, 422, 431, and 432. The heat is generated in each of the batteries 421, 422, 431, and 432 through repetitions of the charging and discharging process performed on each of the batteries 421, 422, 431, and 432. Thus, a temperature of each of the batteries 421, 422, 431, and 432 may increase.

The battery management apparatus 410 may increase a temperature of each of the batteries 421, 422, 431, and 432 without consuming power of each of the batteries 421, 422, 431, and 432. In addition, the battery 431 with relatively low state information may be discharged less and charged more, and the batteries 421 and 432 with relatively high state information may be discharged more and charged less, and thus pieces of state information of the batteries 421, 422, 431, and 432 may become equalized.

Figure 5:
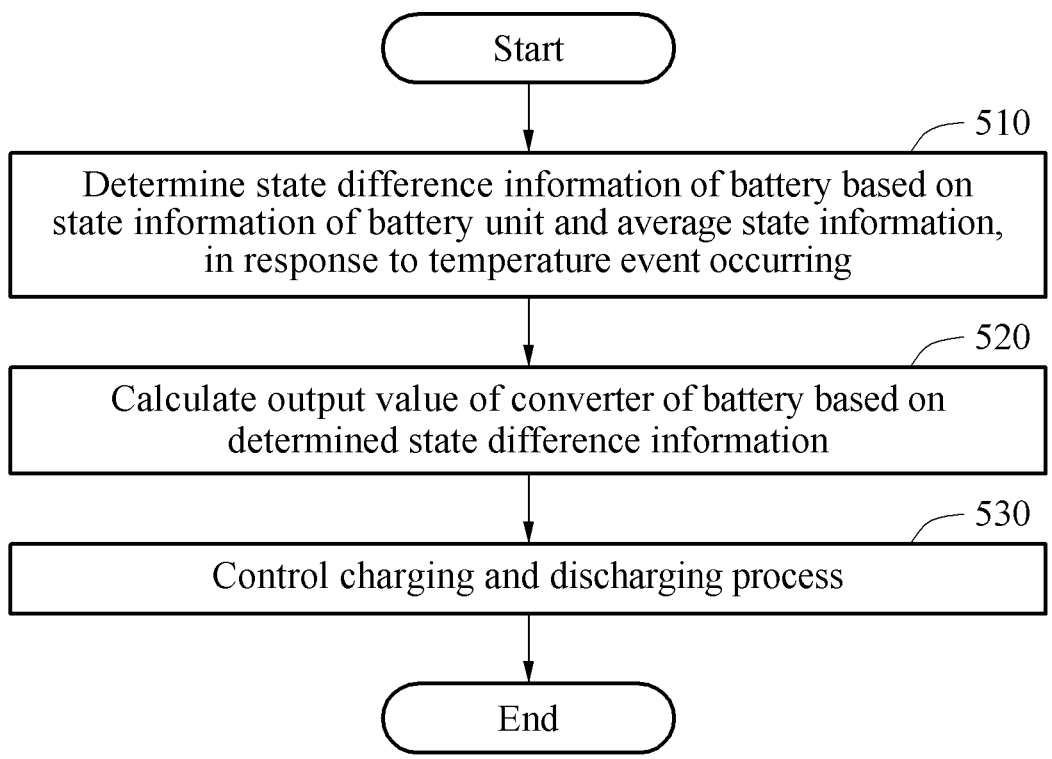
FIG. 5 is a flowchart illustrating another example of a method of controlling a temperature of a battery.

FIG. 5 is a flowchart illustrating another example of a battery temperature controlling method.

Referring to FIG. 5, in operation 510, in response to a temperature event occurring, a battery management apparatus determines state difference information of a battery, among batteries, based on state information of the battery and average state information of the batteries. For example, the battery management apparatus determines the state difference information $\Delta SoC$ of the battery based on an equation $SoC - SoC_{average} = \Delta SoC$.

The temperature event includes an event which is an average temperature of a temperature of the battery and a temperature of another battery among the batteries becoming less than or equal to a threshold temperature.

In operation 520, the battery management apparatus calculates an output value of a converter corresponding to the battery based on the determined state difference information. For example, the battery management apparatus determines the output value $P_{target}$ of the converter based on an equation $P_{target} = P_{average} + P_{average} \times \Delta SoC$.

In an example, the battery management apparatus calculates another output value of the converter corresponding to the battery based on the output value of the converter corresponding to the battery and an output value of a converter corresponding to the other battery. In an example in which an output value for a power flow is calculated, the battery management apparatus calculates another output value corresponding to an electrical-physical quantity flowing in a different direction from the power flow. That is, when an output value to discharge each of the battery and the other battery is calculated, the battery management apparatus calculates another output value to charge the battery based on the calculated output value. For example, the battery management apparatus calculates $P_{target\_1\_1}$ for a power flow in the example illustrated in the left portion of FIG. 4, and calculates $P_{target\_1\_2}$ for a power flow in the example illustrated in the right portion of FIG. 4 based on $P_{target\_1\_1}$, $P_{target\_2\_1}$, $P_{target\_3\_1}$, and $P_{target\_4\_1}$.

In operation 530, the battery management apparatus controls a charging and discharging process. The battery management apparatus may control the charging and discharging process to allow the converter corresponding to the battery to generate the power flow based on the output value.

In an example, the battery management apparatus determines an operation mode of the converter to be one of a charging mode and a discharging mode. The battery management apparatus transmits information on the determined operation mode and the output value to the converter or a slave manager corresponding to the converter. The converter then generates the power flow based on the determined operation mode and the output value. For example, as shown in the example illustrated in the left portion of FIG. 2 or FIG. 3, a power flow flowing from the battery to a power storage is generated.

In response to a toggling event occurring, the battery management apparatus changes the determined operation mode to the other operation mode. The battery management apparatus transmits information on the changed operation mode to the converter or the slave manager corresponding to the converter. The converter generates another power flow different from the power flow flowing before the toggling event occurs. For example, as shown in the example illustrated in the right portion of FIG. 2, a power flow flowing towards the battery from the power storage is generated. In addition, as shown in the example illustrated in the right portion of FIG. 3, the battery management apparatus transmits the information on the changed operation mode and the other output value to the converter or the slave manager corresponding to the converter. The converter generates another power flow different from the power flow flowing before the toggling event occurs. According to an example, as illustrated in the right portion of FIG. 2 and FIG. 3, a power flow flowing towards the battery from the power storage is generated first, and a power flow flowing towards the power storage from the battery is generated thereafter, in response to the toggling event occurring.

In another example, the battery management apparatus classifies the battery and the other battery, which satisfy a preset requirement, into a group. The battery management apparatus determines the operation mode of the converter corresponding to the battery and an operation mode of the converter corresponding to the other battery to be different to each other. For example, as shown in the example illustrated in the left portion of FIG. 4, the battery management apparatus determines the operation mode of the converter corresponding to the battery, for example, the converter 440 illustrated in FIG. 4, to be a discharging mode, and the operation mode of the converter corresponding to the other battery, for example, the converter 441 illustrated in FIG. 4, to be a charging mode. Based on an operation of the converter corresponding to the battery and/or the other battery, a power flow flowing in a single direction between the battery and the other battery is generated. For example, as shown in the example illustrated in the left portion of FIG. 4, a power flow flowing towards the other battery, for example, the battery 422 illustrated in FIG. 4, from the battery, for example, the battery 421 illustrated in FIG. 4, through the converters, for example, the converters 440 and 441 illustrated in FIG. 4, is generated.

In response to the toggling event occurring, the battery management apparatus changes the determined operation mode of each of the converter corresponding to the battery and the converter corresponding to the other battery. For example, as shown in the example illustrated in the right portion of FIG. 4, the battery management apparatus determines the operation mode of the converter corresponding to the battery, for example, the converter 440, to be the charging mode and the operation mode of the converter corresponding to the other battery, for example, the converter 441, to be the discharging mode. Based on an operation of the converter corresponding to the other battery and/or the battery, a power flow flowing in a single direction between the other battery and the battery is generated. For example, as illustrated in the left portion of FIG. 4, a power flow flowing towards the battery, for example, the battery 421, from the other battery, for example, the battery 422, through the converters, for example, the converters 440 and 441, is generated. According to an example, the power flow as shown in the example illustrated in the right portion of FIG. 4 is generated first. The power flow as shown in the example illustrated in the left portion of FIG. 4 is generated thereafter, in response to the toggling event occurring.

Through the charging and discharging process, a charging current and a discharging current flows in an internal resistance of the battery. Thus, heat is generated, and a temperature of the battery may increase. Similarly, through the charging and discharging process, a temperature of the other battery may increase.

In response to an average temperature occurring recently after the charging and discharging process being greater than or equal to a target temperature, the battery management apparatus terminates the charging and discharging process. According to an example, the battery management apparatus determines whether the average temperature occurring recently after the charging and discharging process is greater than or equal to the target temperature, at each time the toggling event occurs.

The descriptions provided with reference to FIGS. 1 through 4 are applicable to the description provided with reference to FIG. 5, and thus a more detailed and repeated description with respect to FIG. 5 will be omitted for brevity.

Figure 6:
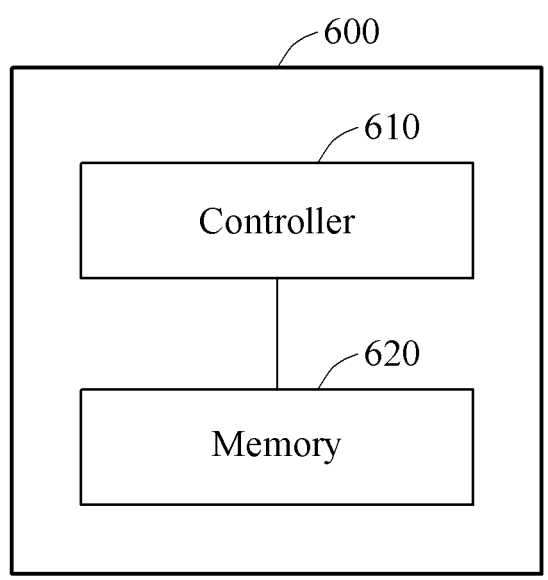
FIG. 6 is a diagram illustrating an example of a battery management apparatus.

FIG. 6 is a diagram illustrating an example of a battery management apparatus 600. Referring to FIG. 6, the battery management apparatus 600 includes a controller 610 and a memory 620.

The controller 610 and the memory 620 constitute a processing apparatus, for example, a microcontroller unit (MCU).

The controller 610 and the memory 620 are communicatively connected. For example, the controller 610 and the memory 620 are electrically connected to each other.

The memory 620 stores an instruction associated with an operation of the controller 610, and the controller 610 implements the instruction. In response to a temperature event occurring, the controller 610 determines state difference information of a battery based on state information of the battery and average state information. The controller 610 calculates an output value of a converter corresponding to the battery based on the determined state difference information. The controller 610 controls a charging and discharging process to allow the converter to generate a power flow based on the calculated output value.

The descriptions provided with reference to FIGS. 1 through 5 are applicable to the description provided with reference to FIG. 6, and thus a more detailed and repeated description with respect to FIG. 6 will be omitted here for brevity.

Figure 7:
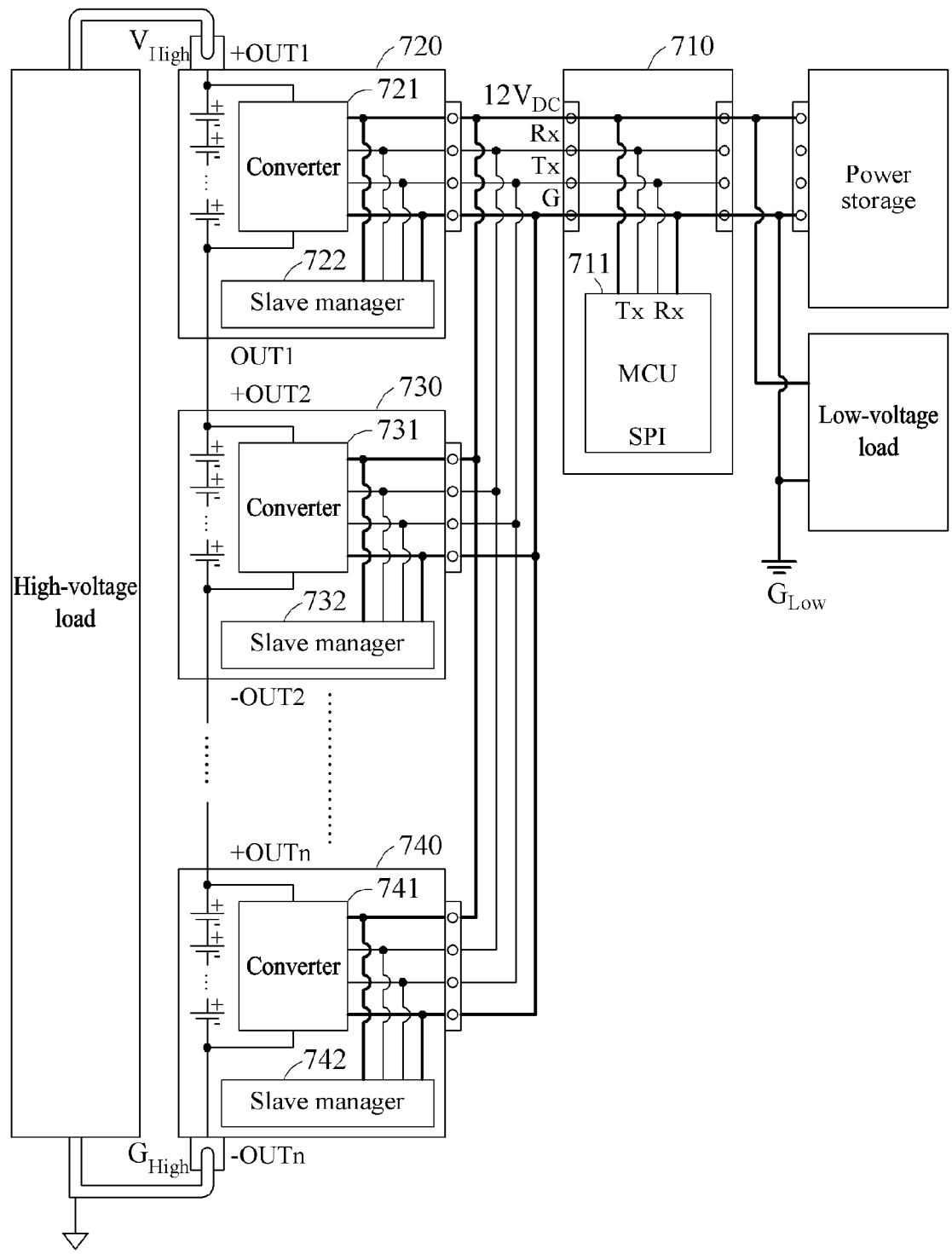
FIG. 7 is a diagram illustrating an example of a battery management system (BMS).

FIG. 7 is a diagram illustrating an example of a battery management system (BMS) 700. Referring to FIG. 7, the BMS 700 includes a master manager 710 and slave managers, for example, a slave manager 722, a slave manager 732, and a slave manager 742.

The master manager 710 corresponds to a battery management apparatus described herein. Thus, the master manager 710 performs a battery temperature controlling method described herein.

In the example of FIG. 7, converters, for example, a converter 721, a converter 731, and a converter 741, and the slave managers 722, 732, and 742 are included in battery modules, for example, a battery module 720, a battery module 730, and a battery module 740, respectively. Such an example is provided only as an illustrative example, and thus the converters 721, 731, and 741 may be disposed outside the battery modules 720, 730, and 740, respectively. Also, the slave managers 722, 732, and 742 may be disposed outside the battery modules 720, 730, and 740, respectively.

Each of the slave managers 722, 732, and 742 senses a physical quantity of a battery cell included in a respective one of the battery modules 720, 730, and 740. For example, the slave manager 722 senses a voltage, a current, and/or a temperature of battery cells in the battery module 720. Each of the slave managers 722, 732, and 742 transmits physical quantity information to the master manager 710. The physical quantity information includes, for example, current information, voltage information, and/or temperature information.

The master manager 710 determines state information of each of the battery modules 720, 730, and 740 based on the received physical quantity information. The master manager 710 determines average state information of the determined pieces of state information. In addition, the master manager 710 calculates an average temperature based on the received temperature information. The master manager 710 compares the calculated average temperature and a threshold temperature. In response to the average temperature being determined to be less than or equal to the threshold temperature, for example, in response to a temperature event occurring, the master manager 710 determines state difference information of each of the battery modules 720, 730, and 740.

The master manager 710 calculates an output value of each of the converters 721, 731, and 740 using the state difference information of each of the battery modules 720, 730, and 740, and required physical quantity information of a load, for example, a low-voltage load. The master manager 710 controls a charging and discharging process to allow each of the converters 721, 731, and 741 to generate a power flow based on the calculated output value. For example, the master manager 710 determines an operation mode of each of the converters 721, 731, and 741. The master manager 710 transmits information on the determined operation mode and the calculated output value to the slave managers 722, 732, and 742, respectively. For example, the master manager 710 may transmit the information on the determined operation mode and $P_{target\_1}$ to the slave manager 722.

The slave managers 722, 732, and 742 control the converters 721, 731, and 741, respectively, based on the information on the determined operation mode and the calculated output value. For example, the slave manager 722 controls the converter 721 based on the information on the determined operation mode and $P_{target\_1}$. Each of the converters 721, 731, and 741 generates a power flow described with reference to FIGS. 2 through 4.

The aforementioned operation of the master manager 710 is implemented by an MCU 711.

The descriptions provided with reference to FIGS. 1 through 6 are applicable to the description provided with reference to FIG. 7, and thus a more detailed and repeated description with respect to FIG. 7 will be omitted here for brevity.

Figure 8:
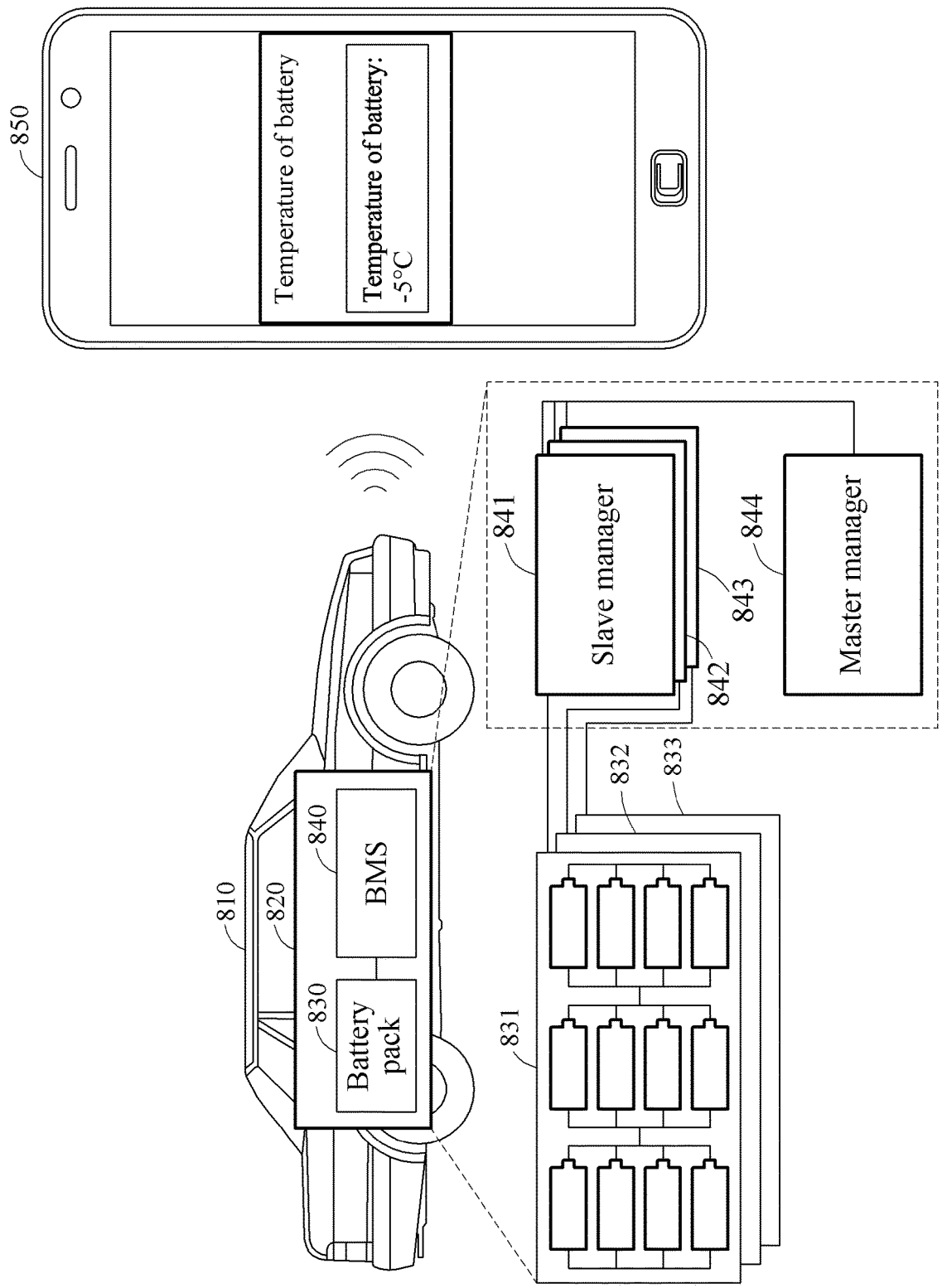
FIG. 8 is a diagram illustrating an example of a vehicle including a battery system.

FIG. 8 is a diagram illustrating an example of a vehicle 810. The vehicle 810 is, for example, an electric vehicle (EV) or a hybrid vehicle.

Referring to FIG. 8, the vehicle 810 includes a battery system 820. The battery system 820 includes a battery pack 830 and a BMS 840. As illustrated in FIG. 8, the BMS 840 may be disposed outside the battery pack 830. However, such an example is provided only as an illustrative example, and thus the BMS 840 may be disposed inside the battery pack 830.

The battery pack 830 includes battery modules, for example, a battery module 831, a battery module 832, and a battery module 833. Each of the battery modules 831, 832, and 833 includes battery cells.

The BMS 840 transmits temperature information of the battery pack 830 to an electronic control unit (ECU) (not shown) of the vehicle 810. The temperature information of the battery pack 830 corresponds to an average temperature described with reference to FIGS. 1 through 7. The ECU transmits the temperature information of the battery pack 830 to a user terminal 850 through a wireless communication interface. The user terminal 850 displays the temperature information.

In response to a temperature of the battery pack 830 being less than or equal to a threshold temperature, the BMS 840 performs a battery temperature controlling method described herein. The BMS 840 transmits a message on performance of the battery temperature controlling method to the ECU, and the ECU transmits the message to the user terminal 850. By performing the battery temperature controlling method, the battery modules 831, 832, and 833 in the battery pack 830 are charged and/or discharged. Due to the charging and discharging, the temperature of the battery pack 830 may increase. In response to the temperature of the battery pack 830 being greater than or equal to a target temperature, the ECU transmits, to the user terminal 850, current temperature information of the battery pack 830 and a message indicating completion of the battery temperature controlling method.

Each of the slave mangers 841, 842, and 843 and/or the master manager 844 may be embodied in a form of a chip. The BMS 840 may be provided in a mass BMS, such as, for example, an energy storage system (ESS). The BMS 840 may also be provided in an electronic device or a device management system in which a rechargeable battery is provided.

The descriptions provided with reference to FIGS. 1 through 7 are applicable to the description provided with reference to FIG. 8, and thus a more detailed and repeated description with respect to FIG. 8 will be omitted here for brevity.

The battery management apparatus 210 and the converters 230, 231, 232, and 233 in FIG. 2, the battery management apparatus 310 and the converters 330, 331, 332, and 333 in FIG. 3, the battery management apparatus 410 and the converters 440, 441, 442 and 443 in FIG. 4, the battery management apparatus 600, the controller 610, and the memory 620 in FIG. 6, the BMS 700, the master manager 710, the MCU 711, the converters 721, 731, and 741, slave managers 722, 732, and 742 in FIG. 7, and the battery system 820, the BMS 840, the slave managers 841, 842, and 843, the master manager 844, and the user terminal 850 in FIG. 8 that perform the operations described in this application are implemented by hardware components configured to perform the operations described in this application that are performed by the hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1 to 5 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions in the specification, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A method to control a battery temperature, the method comprising:
   determining state difference information of a first battery, among batteries, based on state of charge (SoC) information of the first battery and average SoC information of the batteries, in response to a first average temperature of the batteries becoming less than or equal to a threshold temperature, wherein the average SoC information is an average of respective SoCs of the batteries;
   calculating a first output value of a first converter corresponding to the first battery based on the determined state difference information;
   controlling the battery temperature of the batteries to be greater than a threshold temperature and less than a target temperature by controlling a charging and discharging process of the first battery to cause the first converter to generate a power flow based on the first output value; and
   terminating the charging and discharging process in response to a second average temperature of the batteries being greater than or equal to the target temperature as a result of the charging and discharging process, wherein the target temperature is higher than the threshold temperature.

2. The method of claim 1, wherein the controlling of the charging and discharging process comprises:
   determining an operation mode of the first converter to be either one of a charging mode and a discharging mode;
   transmitting information on the determined operation mode and the first output value to either one of the first converter and a controller corresponding to the first converter; and
   in response to a toggling event associated with a change in direction of the power flow occurring, changing the determined operation mode to be another of the charging mode and the discharging mode.

3. The method of claim 2, wherein the controlling of the charging and discharging process comprises
   transmitting, to either one of the first converter and the controller, information on the changed operation mode to cause the first converter to generate another power flow different from the power flow.

4. The method of claim 3, wherein the determining of the operation mode of the first converter comprises
   determining the operation mode of the first converter using either one or both of electrical-physical quantity information of a power storage different from the first battery and the state information of the first battery.

5. The method of claim 1, wherein the calculating of the first output value comprises
   calculating the first output value using the state difference information and required physical quantity information of a load.

6. The method of claim 1, further comprising:
   calculating a second output value corresponding to an electrical-physical quantity flowing in another direction different from a direction of the power flow based on the first output value and an output value of a second battery, among the batteries.

7. The method of claim 6, wherein
   the power flow comprises power corresponding to the first output value flowing from a first end to a second end of the first converter, and
   in response to a toggling event associated with a change in direction occurring, another power flow flowing in the other direction and comprising power corresponding to the second output value flowing from the second end to the first end is generated.

8. The method of claim 1, wherein the controlling of the charging and discharging process comprises:
   classifying the first battery and a second battery, among the batteries, that satisfy a preset requirement into a group;
   determining an operation mode of the first converter and an operation mode of a second converter corresponding to the second battery to be different from each other; and
   in response to a toggling event associated with a change in direction of the power flow in the group occurring, changing the determined operation mode of each of the first converter and the second converter.

9. The method of claim 8, wherein the requirement comprises either one or both of a requirement associated with a difference between the SOC information of the first battery and SOC information of the second battery, and a requirement associated with proximity between the first battery and the second battery.

10. The method of claim 8, wherein the first converter is configured to receive first power corresponding to the first output value from the first battery and output the first power to the second converter before the toggling event occurs, and to receive second power corresponding to a second output value of the second converter from the second battery and charge the first battery with the second power, in response to the toggling event occurring.

11. The method of claim 8, wherein the classifying of the first battery and the second battery comprises classifying the first battery and the second battery into the group based on state of charge (SoC) of the first battery and SoC of the second battery.

12. A non-transitory computer-readable storage medium storing instructions that, when executed by a processor, cause the processor to perform the method of claim 1.

13. The method of claim 1, wherein the power flow changes direction in response to a period of time elapsing.

14. A battery management apparatus, comprising:
a controller configured to:
determine state difference information of a first battery, among batteries, based on state of charge (SoC) information of the battery and average SoC information of the batteries, in response to a first average temperature of the batteries becoming less than or equal to a threshold temperature, wherein the average SoC information is an average of respective SoCs of the batteries;
calculate a first output value of a first converter corresponding to the first battery based on the determined state difference information;
control a battery temperature of the batteries to be greater than a threshold temperature and less than a target temperature by controlling a charging and discharging process of the first battery to cause the first converter to generate a power flow based on the first output value; and
terminate the charging and discharging process in response to a second average temperature of the batteries being greater than or equal to the target temperature as a result of the charging and discharging process, wherein the target temperature is higher than the threshold temperature.

15. The apparatus of claim 14, wherein the controller is further configured to
determine an operation mode of the first converter to be one of a charging mode and a discharging mode,
transmit information on the determined operation mode and the first output value to either one of the first converter and a sub-controller corresponding to the first converter, and
change the determined operation mode to the other operation mode, in response to a toggling event associated with a change in direction of the power flow occurring.

16. The apparatus of claim 15, wherein the controller is further configured to transmit information on the changed operation mode to either one of the first converter and the sub-controller to cause the first converter to generate another power flow different from the power flow.

17. The apparatus of claim 16, wherein the controller is further configured to determine the operation mode of the first converter using either one or both of electrical-physical quantity information of a power storage different from the first battery and the state information of the first battery.

18. The apparatus of claim 14, wherein the controller is further configured to calculate the first output value using the state difference information and required physical quantity information of a load.

19. The apparatus of claim 14, wherein the controller is further configured to calculate a second output value corresponding to an electrical-physical quantity flowing in another direction different from a direction of the power flow based on the first output value and an output value of a second battery, among the batteries.

20. The apparatus of claim 14, wherein the controller is further configured to
classify the first battery and a second battery, among the batteries, which satisfy a preset requirement, into a group,
determine an operation mode of the first converter and an operation mode of a second converter corresponding to the second battery to be different from each other, and
change the determined operation mode of each of the first converter and the second converter, in response to a toggling event associated with a change in direction of the power flow in the group occurring.

21. The apparatus of claim 20, wherein the requirement comprises either one or both of a requirement associated with a difference between the state information of the battery and state information of the other battery, and a requirement associated with proximity between the first battery and the second battery.

22. The apparatus of claim 14, further comprising:
a memory configured to store an instruction to operate the controller.

23. A battery management system, comprising:
a slave manager configured to sense a physical quantity of a battery, among batteries; and
a master manager configured to:
receive the sensed physical quantity from the slave manager;
determine state of charge (SoC) information of the battery based on the received physical quantity;
determine state difference information of the battery based on the determined SoC information and average SoC information of the batteries, in response to a first average temperature of the batteries becoming less than or equal to a threshold temperature, wherein the average SoC information of the batteries is an average of respective SoCs of the batteries;
calculate an output value of a converter corresponding to the battery based on the determined state difference information;
control a battery temperature of the batteries to be greater than a threshold temperature and less than a target temperature by controlling a charging and discharging process of the battery to cause the converter to generate a power flow based on the calculated output value; and
terminate the charging and discharging process in response to a second average temperature of the batteries being greater than or equal to the target temperature as a result of the charging and discharging process, wherein the target temperature is higher than the threshold temperature.

* * * * *